(12) United States Patent
Cheng et al.

(10) Patent No.: US 12,097,454 B2
(45) Date of Patent: Sep. 24, 2024

(54) AIR-FILTER MEDIA INCLUDING A RELOFTED SPUNBONDED WEB, AND METHODS OF MAKING AND USING

(71) Applicant: 3M INNOVATIVE PROPERTIES COMPANY, St. Paul, MN (US)

(72) Inventors: Liang Cheng, Shanghai (CN); Xiaoshuan Fu, Shanghai (CN); Zhiqun Zhang, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 627 days.

(21) Appl. No.: 17/263,793

(22) PCT Filed: Aug. 3, 2018

(86) PCT No.: PCT/CN2018/098455
§ 371 (c)(1),
(2) Date: Jan. 27, 2021

(87) PCT Pub. No.: WO2020/024245
PCT Pub. Date: Feb. 6, 2020

(65) Prior Publication Data
US 2021/0308610 A1    Oct. 7, 2021

(51) Int. Cl.
*B01D 39/16* (2006.01)
*B01D 46/00* (2022.01)
*B01D 46/52* (2006.01)

(52) U.S. Cl.
CPC ....... *B01D 39/163* (2013.01); *B01D 46/0001* (2013.01); *B01D 46/521* (2013.01);
(Continued)

(58) Field of Classification Search
CPC ............. B01D 39/163; B01D 46/0001; B01D 46/521; B01D 2239/0414; B01D 2239/0618; B01D 2239/0627; B01D 2239/10; B01D 2239/1266; B01D 2239/0435; B01D 39/1623
See application file for complete search history.

(56) References Cited

U.S. PATENT DOCUMENTS 4,517,714 A    5/1985   Sneed
5,240,764 A    8/1993   Haid
(Continued)

FOREIGN PATENT DOCUMENTS

CN    1460534      12/2003
CN    103691200    4/2014
(Continued)

OTHER PUBLICATIONS

Translation of JP2018015702A, accessed Feb. 28, 2024 (Year: 2018).*
(Continued)

*Primary Examiner* — Christopher P Jones
*Assistant Examiner* — Phillip Y Shao
(74) *Attorney, Agent, or Firm* — Kenneth B. Wood (57) ABSTRACT

A relofted, spunbonded nonwoven web exhibiting a solidity of from less than 8.0%, to at least 3.0%, and exhibiting a Quality Factor of at least 0.30. Methods of making a relofted web; and, methods of using a relofted web as an air-filtration web. e.g. as a filter media or a layer thereof.

16 Claims, 4 Drawing Sheets

(52) U.S. Cl.
CPC ............... *B01D 2239/0414* (2013.01); *B01D 2239/0618* (2013.01); *B01D 2239/0627* (2013.01); *B01D 2239/10* (2013.01); *B01D 2239/1266* (2013.01)

(56) References Cited

U.S. PATENT DOCUMENTS

| | | | |
|---|---|---|---|
| 5,320,891 | A | 6/1994 | Levy |
| 5,641,555 | A | 6/1997 | Berrigan et al. |
| 5,662,728 | A | 9/1997 | Groeger |
| 5,898,981 | A * | 5/1999 | Legare ............... B01D 39/08 28/107 |
| 5,928,973 | A | 7/1999 | Daniel |
| 6,321,425 | B1 | 11/2001 | Putnam |
| 6,858,297 | B1 | 2/2005 | Shah |
| 6,903,034 | B1 | 6/2005 | Putnam |
| 7,015,158 | B2 | 3/2006 | Pearce |
| 7,691,760 | B2 | 4/2010 | Bergsten |
| 7,968,176 | B2 | 6/2011 | Umezu |
| 8,162,153 | B2 | 4/2012 | Fox |
| 8,240,484 | B2 | 8/2012 | Fox |
| 8,425,729 | B2 | 4/2013 | Skoog |
| 8,454,780 | B2 | 6/2013 | Anderson |
| 8,512,607 | B2 | 8/2013 | Pedoja |
| 8,613,795 | B2 | 12/2013 | Li |
| 8,790,449 | B2 | 6/2014 | Li |
| 9,067,357 | B2 | 6/2015 | Orr |
| 9,731,237 | B2 | 8/2017 | Ng |
| 9,976,771 | B2 | 5/2018 | Chen |
| 2006/0084344 | A1 | 4/2006 | Bonneh |
| 2007/0035058 | A1* | 2/2007 | Ogle .................. D04H 1/06 264/113 |
| 2008/0038976 | A1 | 2/2008 | Berrigan |
| 2008/0070022 | A1* | 3/2008 | Umezu ............... F02M 35/024 428/315.7 |
| 2010/0031618 | A1 | 2/2010 | Grove, III |
| 2010/0159775 | A1 | 6/2010 | Chambers, Jr. |
| 2010/0252047 | A1 | 10/2010 | Kirk et al. |
| 2011/0000845 | A1* | 1/2011 | Fox .................... D04H 3/16 428/176 |
| 2011/0250378 | A1 | 10/2011 | Eaton |
| 2012/0017910 | A1 | 1/2012 | Li |
| 2013/0112625 | A1 | 5/2013 | Bahukudumbi et al. |
| 2015/0322606 | A1* | 11/2015 | Strålin ............... D01D 5/0985 264/103 |
| 2016/0067647 | A1 | 3/2016 | Tate |
| 2016/0206984 | A1 | 7/2016 | Berrigan |
| 2017/0241054 | A1 | 8/2017 | Song |
| 2021/0308610 | A1 | 10/2021 | Cheng et al. |

FOREIGN PATENT DOCUMENTS

| | | |
|---|---|---|
| CN | 206715518 U | 12/2017 |
| EP | 3290014 | 3/2018 |
| JP | 2005273097 | 10/2005 |
| JP | 2008057053 | 3/2008 |
| JP | 2018015702 A | 2/2018 |
| WO | 2005102497 A1 | 11/2005 |
| WO | 2010151542 A2 | 12/2010 |
| WO | WO 2012-077402 | 6/2012 |
| WO | 2015054097 A1 | 4/2015 |
| WO | 2016032930 | 3/2016 |
| WO | WO 2017-213926 | 12/2017 |
| WO | WO 2020-026152 | 2/2020 |

OTHER PUBLICATIONS

"Performance And Fit", Nonwovens Industry Magazine, [retrieved from the internet on Jan. 1, 2013], URL <https://www.nonwovens-industry.com/issues/2013-01/view_features/performance-and-fit>, 2018, pp. 1-9.

International Search Report for PCT International Application No. PCT/CN2018/098455, mailed on Apr. 29, 2019, 5 pages.

* cited by examiner

AIR-FILTER MEDIA INCLUDING A RELOFTED SPUNBONDED WEB, AND METHODS OF MAKING AND USING

BACKGROUND

Air-filter media are widely used for the purpose of removing particulate matter from air.

SUMMARY

In broad summary, herein is disclosed is a relofted, spunbonded nonwoven web exhibiting a solidity of from less than 8.0%, to at least 3.0%, and exhibiting a Quality Factor of at least 0.30. Methods of making a relofted web are also disclosed. The use of a relofted web as an air-filtration web, e.g. as a filter media or a layer thereof, are also disclosed. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", "lower", "under", "over", "front", "back", "outward", "inward", "up" and "down", and "first" and "second" may be used in this disclosure, it should be understood that those terms are used in their relative sense only unless otherwise noted.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−10% for quantifiable properties). The term "essentially" means to a very high degree of approximation (e.g., within plus or minus 2% for quantifiable properties; it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. As used herein, terms such as "essentially free of", and the like, do not preclude the presence of some extremely low, e.g. 0.1% or less, amount of material, as may occur e.g. when using large scale production equipment subject to customary cleaning procedures. The term "configured to" and like terms is at least as restrictive as the term "adapted to", and requires actual design intention to perform the specified function rather than mere physical capability of performing such a function. All references herein to numerical parameters (dimensions, ratios, and so on) are understood to be calculable (unless otherwise noted) by the use of average values derived from a number of measurements of the parameter.

DETAILED DESCRIPTION

The term "spunbonded" refers to a nonwoven web comprised of meltspun fibers, at least some of which fibers exhibit fiber-fiber bonds e.g. as provided by autogenous bonding as described later herein.

The term "meltspun" refers to fibers that are formed by extruding filaments out of a set of orifices and allowing the filaments to cool and solidify to form fibers, with the filaments passing through an air space (which may contain streams of moving air) to assist in cooling the filaments and passing through an attenuation (i.e., drawing) unit to at least partially draw the filaments.

The term "solidity" denotes a dimensionless fraction (usually reported in %) that represents the proportion of the total volume of a fibrous web that is occupied by the solid (e.g. polymeric fibrous) material. Further explanation, and methods for obtaining solidity, are found in the Examples section. Loft is 100% minus solidity and represents the proportion of the total volume of the web that is unoccupied by solid material.

The term "Quality Factor" is a figure of merit for the overall performance of a filter media in filtering particles from air, and is defined and discussed later herein.

The term "self-supporting" denotes a spunbonded web (whether or not it has been relofted) that exhibits sufficient mechanical integrity to be handled and subjected to conventional web handling processes (e.g. winding, unwinding, and the like).

Disclosed herein is an air-filter media comprising a relofted, spunbonded nonwoven web exhibiting a solidity of from less than 8.0% to at least 3.0% and exhibiting a Quality Factor of at least 0.30. The term "spunbonded" refers to a nonwoven web comprised of meltspun fibers, at least some of which fibers exhibit fiber-fiber bonds e.g. as provided by autogenous bonding as described later herein. The term "meltspun" refers to fibers that are formed by extruding filaments out of a set of orifices and allowing the filaments to cool and solidify to form fibers, with the filaments passing through an air space (which may contain streams of moving air) to assist in cooling the filaments and passing through an attenuation (i.e., drawing) unit to at least partially draw the filaments. Meltspinning can be distinguished from meltblowing in that meltblowing involves the extrusion of filaments into converging high velocity air streams introduced by way of air-blowing orifices located in close proximity to the extrusion orifices.

Figure 1:
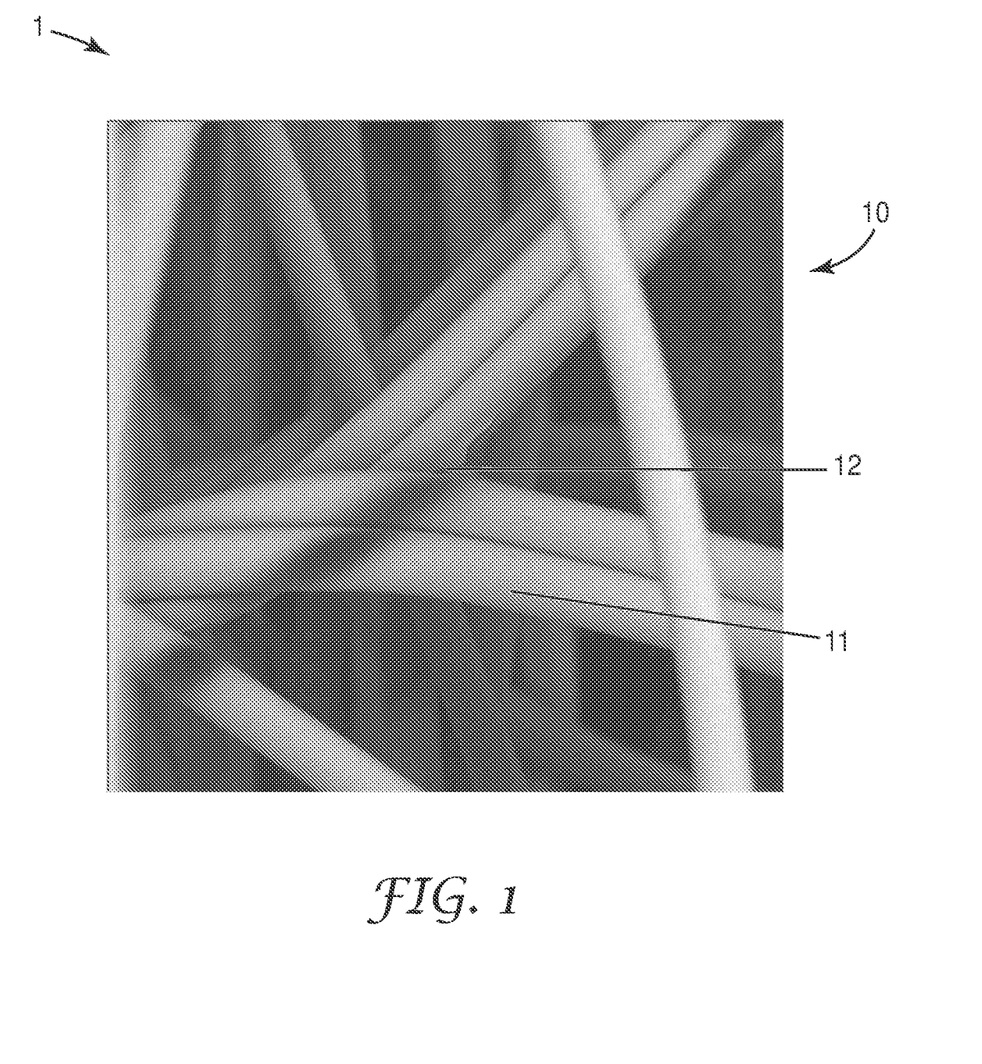
FIG. 1 is a scanning electron micrograph at 1250 times magnification in top view, of a portion of an exemplary relofted, spunbonded nonwoven web.

Web 10 is a relofted spunbonded web. The term "relofted" denotes a spunbonded nonwoven web that has been subjected to a post-processing step that increases the loft (lowers the solidity) of the spunbonded nonwoven web. By definition, a relofted web will be self-supporting as defined above. A relofted spunbonded web can be identified, and distinguished from spunbonded webs that are not relofted, at least by the presence of broken fiber-fiber bonds, as discussed in detail later herein. Exemplary broken fiber-fiber bonds 12 of fibers 11 of relofted webs 10, are pointed out in the scanning electron microscope photographs presented in FIGS. 1 and 2.

A relofting process, particularly when performed on a spunbonded precursor web that already comprises a high loft (i.e., as manifested as a solidity of under 10%), has been found to impart significant advantages. For example, a relofted spunbonded web may exhibit a significant decrease (e.g., of up to 50%) in airflow resistance (as manifested by a Pressure Drop measurement as discussed in the Examples section herein) relative to the precursor spunbonded web. However, the relofted spunbonded web may exhibit only a rather small increase in the ability of airborne particulates to penetrate through the web (as manifested by a Percent Penetration measurement as discussed in the Examples section herein). This advantageous combination of properties is captured by the Quality Factor, which is a well-known figure of merit that is often used for air filter media and which takes into account both Pressure Drop and Percent Penetration, as discussed in the Examples section herein. Relofting a high-loft spunbonded web has been found to significantly enhance (increase) the Quality Factor (e.g. by a factor of up to 50, 70, or even 90% or more), which is a surprising result considering that high-loft spunbonded webs often exhibit a relatively high Quality Factor to begin with. Still further, relofted spunbonded webs have been found to exhibit significantly enhanced Dust Holding Capacity, as evidenced in the Working Examples herein.

Relofted web 10 is produced by post-processing a precursor spunbonded web 9. An exemplary precursor spunbonded web 9 is shown in an optical photograph in FIG. 3. Precursor web 9 comprises meltspun fibers 11. From the definition and description of meltspun fibers provided above, it will be clear that meltspun fibers and the resulting spunbonded webs can be distinguished from meltblown webs (e.g. by way of the molecular orientation imparted to meltspun fibers during the attenuation process). Meltspun fibers can also be distinguished from staple fibers, which are typically cut to a desired length, in contrast to meltspun fibers which are typically continuous except for occasional, statistically-occurring fiber breaks. Meltspun fibers and spunbonded webs can also be distinguished from e.g. carded webs (which typically exhibit a noticeable fiber alignment imparted by the carding process, that is not present in spunbonded webs), and also airlaid webs, wetlaid webs, and so on.

Meltspun fibers 11 can be made from any suitable organic polymeric material that is able to be meltspun. In various embodiments, such fibers may be comprised of polyolefins (e.g., polypropylene, polyethylene, etc.), poly(ethylene terephthalate), nylon, and copolymers and/or blends of any of these. In some embodiments, at least some, or all, of meltspun fibers 11 are monocomponent fibers. The term "monocomponent" refers to the organic polymeric material of a fiber and denotes a fiber in which a continuous phase of uniform polymeric composition extends across the cross-section and over the length of the fiber. In some convenient embodiments, a monocomponent fiber may be a polypropylene fiber. The term monocomponent does not necessitate that the organic polymeric component material is the only component of the fiber. Rather, in various embodiments, any suitable additive, e.g. one or more of antioxidants, plasticizers, processing aids, and so on, may be present for any desired purpose. In particular embodiments, the fiber may include a charging additive for the purpose of allowing a stable electric charge (an "electret") to be imparted to the fiber.

A monocomponent fiber as defined and described above excludes multicomponent fibers such as bicomponent fibers. However, in alternative embodiments, at least some, or all, of meltspun fibers 11 may be multicomponent fibers comprising at least two phases of differing organic polymeric compositions. Such fibers may have any suitable configuration, chosen from e.g. sheath-core, side-by-side, islands-in-the-sea, and so on. In some embodiments, such fibers may include at least one organic polymeric phase with a composition that promotes or enhances bonding, e.g. melt-bonding, of the meltspun fibers to each other. Multicomponent fibers may suitably include any of the above-mentioned additives, e.g. charging additives, in at least one of the phases of the fiber.

Meltspun fibers may be generated (e.g. extruded, solidified and attenuated) and collected using any suitable melt-spinning method. In some embodiments, apparatus and methods may be used that are presented in U.S. Pat. No. 8,240,484, which is incorporated by reference herein in its entirety. As described in detail in the '484 patent, the approaches disclosed therein can allow the formation of precursor meltspun webs that exhibit a relatively high loft, e.g. as manifested by a solidity of less than e.g. 8.0%.

Meltspun fibers may have any suitable average diameter, e.g. as determined by optical inspection of a statistically meaningful number of fibers. In various embodiments, the meltspun fibers may exhibit an average fiber diameter of at least 1, 2, 4, 6, 10, 15 or 20 microns; in further embodiments the meltspun fibers may exhibit an average fiber diameter of at most 50, 40, 30, 25, 18 or 12 microns. In many embodiments, the meltspun fibers will exhibit a fiber diameter distribution that is unimodal; that is, in such embodiments precursor web 9 and relofted web 10 derived therefrom will not comprise a composite mixture that exhibits distinct populations of e.g. fine and coarse fibers. (It is noted that in general, fiber properties such as e.g. fiber diameter as described herein, will be understood to apply to both precursor web 9 and relofted web 10 derived therefrom.)

Precursor web 9 (and relofted web 10 derived therefrom) is a spunbonded web, meaning a web that comprises at least some fiber-fiber bonds. By a fiber-fiber bond is meant a bond (e.g., a melt-bond) between a small number of fibers (typically five or less; in most cases, two) at a location at which the fibers are in contact with each other. In a fiber-fiber bond, each fiber substantially retains its individual character (e.g. appearance and shape). By definition, fiber-fiber bonds are distinguished from multi-fiber bonds in which large numbers of fibers are bonded to each other, which may be optionally present and are discussed later herein. In many embodiments the fiber-fiber bonds are autogenous bonds. By this is meant fiber-fiber melt bonds obtained by subjecting a collection of meltspun fibers to an elevated temperature (e.g., as achieved by use of an oven and/or a stream of controlled-temperature air) without the application of solid contact pressure onto the web. In some embodiments, such bonding may be so-called through-air bonding performed by directing of heated air onto and through the web, e.g. by the use of a controlled-heating device as discussed in detail in U.S. Patent Application No. 2008/0038976, which is incorporated by reference herein in its entirety for this purpose. In particular embodiments the bonding may be performed by use of apparatus and methods disclosed in U.S. Pat. No. 9,976,771, which is incorporated by reference herein in its entirety for this purpose. It will be appreciated that autogenous bonding, e.g. through-air bonding, can bond fibers to each other to form a self-supporting web without significantly compacting or densifying (e.g. crushing or otherwise significantly reducing the loft of) the web. Autogenous bonding and the resulting bonds are thus distinguished from e.g. bonding performed by calendering, ultrasonic bonding, and like processes. In some embodiments, the fiber-fiber bonding may be between monocomponent fibers (e.g. as described in the '771 patent); in other embodiments, the fiber-fiber bonding may be between particular components of multicomponent (e.g. bicomponent) fibers.

In some embodiments, a spunbonded precursor web, and thus a relofted web derived therefrom, may optionally comprise (in addition to the above-described fiber-fiber bonds) multi-fiber area-bonds of the type exemplified by bonds achieved by calendering, ultrasonic bonding or the like. Exemplary calendered area-bonds 14 are visible in the optical photograph of FIG. 3. As is characteristic of such area-bonds, each bond 14 is seen to comprise numerous (e.g. ten or more) fiber segments that have been melted and consolidated together over a relatively wide area so as to substantially lose their individual character (appearance and shape) in the bonded area. In some embodiments, a spunbonded web may include a relatively low level of such area-bonds; such a level may enhance the mechanical integrity of the web without significantly adversely affecting the properties (e.g. the filtration performance) of the web. In various embodiments, such area-bonds may be present in a precursor web or in a relofted web derived therefrom, at an area percentage of the web that is greater than 0% but is less than 5.0, 4.0, 3.0, 2.5, 2.0, 1.5, 1.0, or 0.5%. By way of a specific example, the web of FIG. 3 comprises multi-fiber area-bonds that appear to be present at an area percentage estimated to be in the range of 1.3-1.5%.

In various embodiments, a precursor spunbonded nonwoven web from which a relofted web is derived, may exhibit a solidity (as an average value) of no more than 10.0, 9.0, 8.0, or 7.0%. In some embodiments, a precursor spunbonded nonwoven web from which a relofted web is derived may include at least some fibers to which an electric charge (e.g. a quasi-permanent charge commonly referred to as an electret) has been imparted. In various embodiments, the web may be e.g. corona charged or hydrocharged. It will be appreciated that in such embodiments, any subsequent relofting process should be performed so that it does not unacceptably diminish the electret charges. Methods of charging fibers and webs, and additives that can enhance the ability of fibers to receive and retain charges, are disclosed e.g. in U.S. Pat. Nos. 8,613,795 and 8,790,449 and in US Patent Application Publication No. 2016/0206984, all of which are incorporated by reference herein in their entirety for this purpose. A relofting process as disclosed herein may be performed on any suitable spunbonded web.

Spunbonded webs that may be particularly suitable include e.g. those of the general type described in U.S. Patent Application Publication 20080038976 to Berrigan. Any such media can be charged to form an electret, if desired. In some embodiments, a spunbonded web may be a high-loft spunbonded web. As used herein, this signifies a web that exhibits a solidity of less than 10.0%. Particular high-loft spunbonded webs (e.g. with a solidity of less than 8.0%) that may be suitable for relofting, and methods of making such webs, are disclosed in U.S. Pat. No. 8,162,153 to Fox, which is incorporated by reference herein in its entirety.

Precursor spunbonded web 9 is subjected to a relofting process to form relofted web 10. As noted earlier, a relofting process is a post-processing step that is applied to a precursor spunbonded web to increase the loft (lower the solidity) of the web. In this process, a significant percentage (e.g., greater than 5%) of the above-described fiber-fiber bonds are broken so that broken bonds 12 are visible e.g. as in FIG. 1. Those of ordinary skill will readily appreciate that a small number of broken fiber-fiber bonds may occur in the conventional handling and processing of a spunbonded web. However, those of ordinary skill in the art of producing and handling spunbonded webs will readily understand that such phenomena, as may occasionally occur statistically in any real-life web-production process, will be distinguishable from the present instance in which a significant percentage of the fiber-fiber bonds are purposefully broken in order to increase the loft of the web.

A spunbonded web can be identified as a relofted web by virtue of the presence of a significant number of fiber-fiber bonds that have been broken. A relofted web may exhibit other identifying features. For example, in a relofted web at least some of the fibers have been physically moved, separated from each other, deformed, rearranged, or the like, so that the web may exhibit a more fibrillated appearance. In other words, a relofted web may be visibly more "fuzzy" than the precursor web from which it was derived. Indeed a relofted web may be more "fuzzy" than typical spunbonded webs on casual visual inspection.

Figure 3:
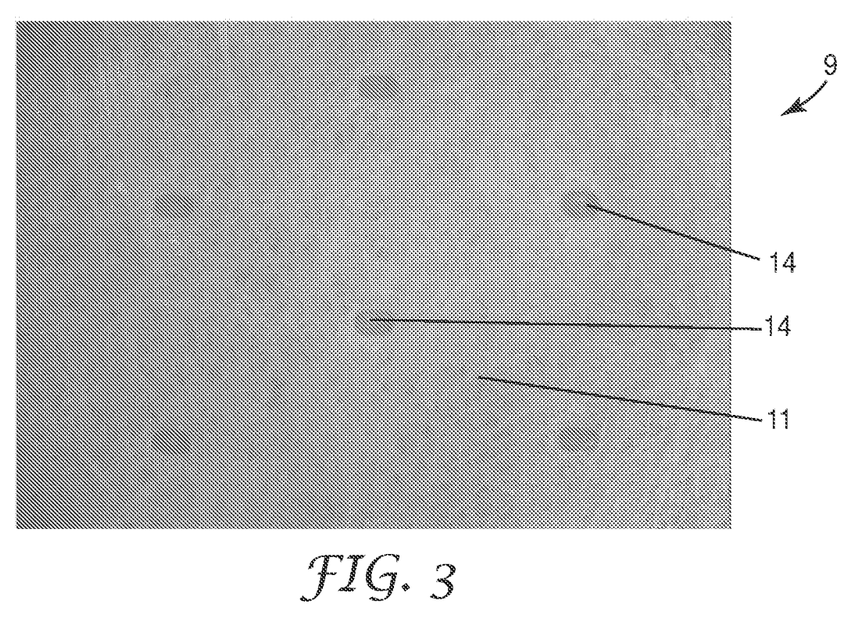
FIG. 3 is an optical photograph at 20 times magnification in top view, of a portion of an exemplary precursor spunbonded nonwoven web from which a relofted web may be obtained.
Figure 4:
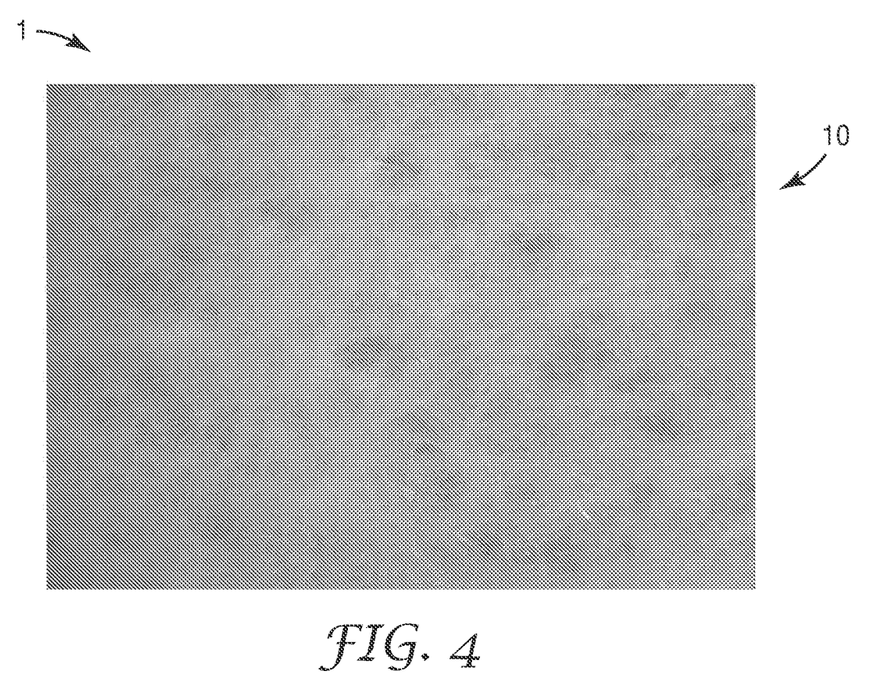
FIG. 4 is an optical photograph at 20 times magnification in top view, of a portion of an exemplary relofted, spunbonded nonwoven web.

Such a property can be particularly evident in embodiments in which the web comprises optional multi-fiber area bonds. As evidenced by precursor web 9 as shown in FIG. 3, in a typical spun-bonded web any multi-fiber area-bonds 14 are easily observable as flattened areas within which the fibers have lost their individual identity, with very few of no individual fibers overlying the bonded area. As shown in FIG. 4, a relofted web derived from such a precursor web may have had at least some of its fibers rearranged so that some, or most, of the area-bonds are at least partially obscured by overlying fibers.

In some cases, at least some fibers of a relofted web may exhibit characteristics (e.g. stress whitening, stress cracking, crazing, orientation, necking, and so on) that are indicative of the fibers being exposed to significant shear commensurate with a relofting process. Ordinary artisans will thus appreciate that a relofted spunbonded web may be identified by any or all of several characteristics, of individual fibers and/or of the web as a whole, that result from the relofting process. As discussed below, spunbonded webs that have been relofted by methods such as needle-punching and/or hydroentangling may be readily identified as having been subjected to such processes, by virtue of the presence of broken fibers as visible (as items 15) in FIG. 2.

The pattern and area coverage of the relofting will be such that the relofted web will exhibit desired properties in an overall manner, averaged over a macroscopic area (e.g. of at least 10 square cm) of the web. Thus, properties such as solidity, Percent Penetration of particles, Pressure Drop, Quality Factor, and so on, will be understood to be average properties taken over a suitable macroscopic area of the relofted web. The term "relofted" requires that at least 30% of the area of the web has been relofted, so that the overall enhancements in e.g. Quality Factor for the web as a whole may be obtained. In various embodiments, at least about 40, 60, 80, 90, 95, 98, or essentially 100% of the area of the web may be relofted. Such area percentages will be understood to be obtained from a ratio of the relofted area(s) of a web (as defined by the perimeter of the relofted area(s)) to the total area of the web.

In some embodiments, the relofting process may be achieved by performing by numerous local impingements and penetrations of entities into and/or through the precursor web. In some embodiments, such a relofting process is a needle-punching process. Thus, references herein to a web that is relofted and needle-punched denote a web that has been relofted by needle-punching rather than a web that has been relofted and has also been needle-punched for some other purpose. Needle-punching refers to a process in which numerous barbed needles are penetrated into and/or through a mass of fibers and are then reversed so that fibers become entangled. Those of ordinary skill will appreciate that needle-punching is typically used as a method of mechanically interlocking fibers that have been collected in a dry-laid process such as carding, garnetting, air-laying (e.g. Rando-Weber) and so on. That is, needle-punching is commonly thought of as a process used for "bonding" fibers together e.g. to form a self-supporting web. In contrast, in the present work needle-punching is applied to a nonwoven web that has already been bonded to comprise fiber-fiber bonds as discussed earlier herein. That is, in the present case needle-punching is used to break at least some of the already-existing fiber-fiber bonds of a spunbonded web, as evidenced by what appears to be a disrupted or broken bond 12 in the scanning electron microscope photograph of a needle-punched web shown in FIG. 1.

Figure 2:
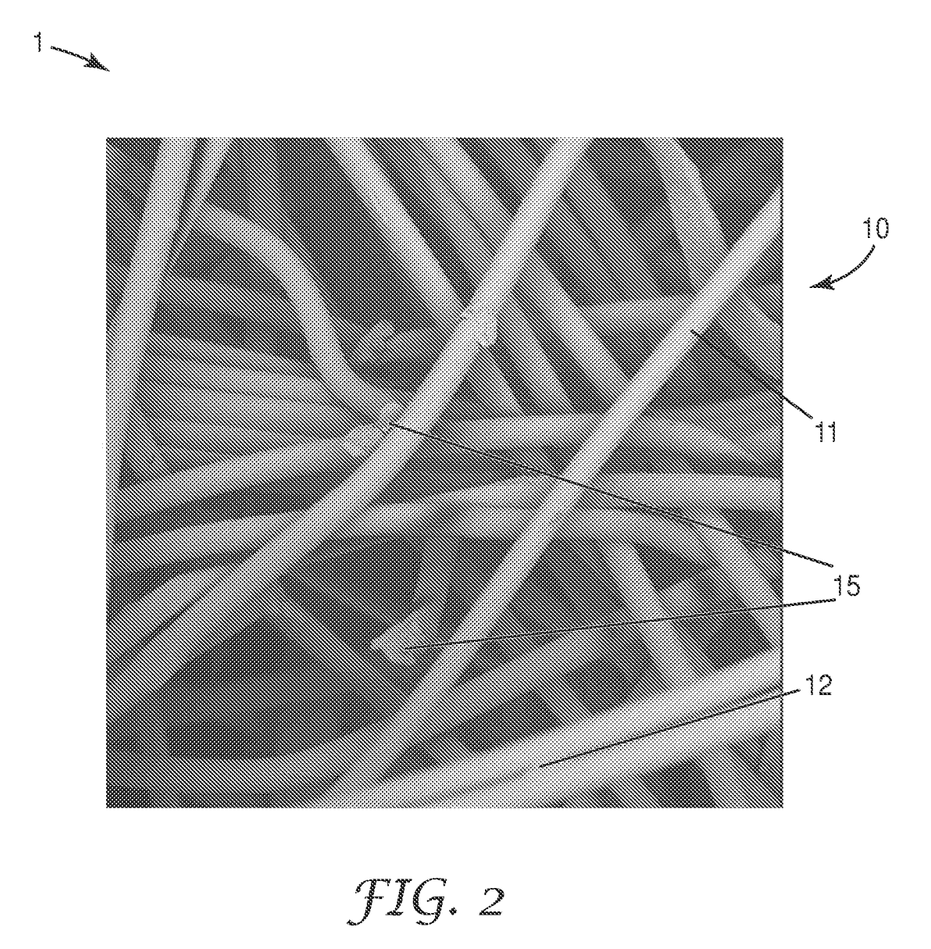
FIG. 2 is a scanning electron micrograph at 740 times magnification in top view, of another portion of an exemplary relofted, spunbonded nonwoven web.

Needle-punching has historically been considered to break fibers, as evidenced by the broken fiber ends 15 in the scanning electron microscope photograph of a needle-punched web shown in FIG. 2. Indeed, needle-punching has been mentioned as having deleterious effects on filtration efficiency due to creating perforations in the web (see for example the Background discussion in U.S. Pat. No. 7,015,158). It is thus a surprising result that, in the present work, needle-punching has been found to be a convenient and successful method of relofting a spunbonded nonwoven precursor web to provide an air-filtration web that exhibits increased loft and that exhibits superior filtration performance e.g. as manifested by Quality Factor and by Dust Holding Capacity.

Needle-punching can be performed in any suitable manner. While each individual needle-penetration might be thought of as only affecting a local zone of the web, it has been found in the present work that needle-punching can be performed so that the needlepunched zones collectively provide a relofted web (or, an area or areas that make up at least 30% of the total area of the web) that exhibits relatively uniform properties across the length and breadth of the web or of the relofted area(s) thereof. Thus in various embodiments, the web may be needle-punched at a punching density of at least 4, 8, 12, 16, 20, 24, 30, 35, or 40 punches per square centimeter of web. Process and apparatus parameters such as the spacing/density of the needles, the strike rate of the needles, the speed of advancing the web through the needle-punching apparatus, and so on, can be adjusted as desired to achieve the desired uniformity as well as to achieve the desired increase in loft. The web can undergo multiple needle-punching passes and/or can be needle-punched from both sides of the web, e.g. in order to further enhance the area uniformity, although this may not be necessary.

In some embodiments, the relofting process may be a hydroentangling process. Thus, references herein to a web that is relofted and hydroentangled denote a web that has been relofted by hydroentangling rather than a web that has been relofted and has also been hydroentangled for some other purpose. Hydroentangling refers to a process in which very fine high velocity jets of water are used (rather than barbed needles) to entangle fibers. Thus in hydroentangling the impinging/penetrating entities are jets of water; hydroentangling is sometimes referred to as "hydraulic needling". Those of ordinary skill will appreciate that hydroentangling has often been used (e.g. instead of needle-punching) for mechanically "bonding" fibers that have been collected in a dry-laid process such as carding, garnetting, air-laying (e.g. Rando-Weber) and so on. In contrast, as disclosed herein hydroentangling is applied to a nonwoven web that has already been bonded to comprise fiber-fiber bonds as discussed earlier herein. That is, hydroentangling is used to break at least some of the already-existing fiber-fiber bonds of a spunbonded web to provide an air-filtration web that exhibits enhanced air-filtration properties.

Hydroentangling can be performed in any suitable manner. Thus, process and apparatus parameters such as the spacing density of the water-jets, the water velocity and pressure, the impingement angle of the water onto the web, the speed of advancing the web through the hydroentangling apparatus, and so on, can be adjusted as desired. In particular, the density at which the water jets are impinged on the spunbonded web (e.g. as established by the water jet spacing and the speed at which the web is passed through the hydroentangling apparatus) can be any suitable value, e.g. at least 4, 8, 12, 16, 20, 24, 30, 35, or 40 impingements per square centimeter of web. The web can undergo multiple hydroentangling passes and/or can be hydroentangled from both sides of the web if desired.

Ordinary artisans will appreciate that processes such as needle-punching and hydroentangling can cause fiber entanglements that can serve as physical "bonds". Such fiber entanglements can contribute to the integrity/self-supporting nature of the relofted web even if relatively few fiber-fiber bonds remain unbroken. However, in many embodiments a number of unbroken fiber-fiber bonds may still be present in a web that is relofted in this manner.

A relofting process may be performed on any air-filtration web to which it is desired to impart improved filtration performance. However, it has been found that a relofting process (however performed) is particularly suited for being performed on a web that already possesses a relatively high loft. That is, relofting a high loft web has been found to significantly lower the Pressure Drop through the web, while having a small or negligible effect on the Percent Penetration of particles through the web. This results in a significantly improved Quality Factor. When relofting was performed on relatively low loft webs (e.g. with solidity of 10% or higher), the Pressure Drop was again significantly lowered; however, the Percent Penetration of particles through the web increased significantly. Thus, the Quality Factor, which takes both of these factors into account, was not significantly improved.

A relofting process as disclosed herein can thus take a relatively high-loft web and increase the loft to an even higher value, and in doing so can increase filtration parameters such as Quality Factor and Dust Holding Capacity. In various embodiments, a precursor web that is to be relofted may exhibit a solidity of less than 10.0, 9.0, 8.0, 7.0 or 6.0%. In various embodiments the relofting process may decrease the solidity by at least 0.1, 0.2, 0.5, 1.0, 1.5, 2.0, 2.5, or 3.0%. (This percentage is expressed in terms of the actual solidity itself; that is, if a precursor web of with a solidity of 8.0% is relofted to have a solidity of 6.5%, this is a decrease in solidity of 1.5%.) In various embodiments, a relofted web may exhibit a solidity of less than 9.0, 8.0, 7.0, 6.0, 5.0 or 4.0%. In further embodiments, a relofted web may exhibit a solidity of greater than 1.0, 2.0, or 3.0%. It is noted that a significant and useful increase in filtration performance, as characterized by Quality Factor, does not necessarily require a large decrease in the measured solidity. Thus, in some cases a solidity decrease as small as e.g. 0.2, 0.1, or even 0.05% may nevertheless correspond to a useful increase in Quality Factor. In various embodiments, a relofted air-filtration web may exhibit a Quality Factor of at least 0.5, 0.7, 1.0, 1.3, or 1.5.

A relofted web may comprise any suitable basis weight. In embodiments e.g. in which the relofting process is a mechanical working process has an overall spreading effect on the web, the basis weight may decrease slightly from that of the precursor web, otherwise the basis weight may remain relatively unchanged. In various embodiments, a relofted web may exhibit a basis weight of no more than 300, 200, 150, 100, 90, or 80 grams per square meter. In further embodiments, a relofted web may exhibit a basis weight of at least 30, 40, or 50 grams per square meter. It is noteworthy that relofting an already high-loft air-filtration web can impart a significant increase (e.g. by a factor of two or more, as evidenced by the Working Examples herein) in Dust Holding Capacity, without the web having to comprise a high basis weight (e.g. 100 grams per square meter or more) or having to comprise deeply embossed (e.g. bag-like) pockets. In various embodiments, a relofted air-filtration web may exhibit a Dust Holding Capacity of at least 30, 40, 50 or 60 grams per square meter.

As noted earlier, in some embodiments a relofted air-filtration web 10 may be pleated. Thus as shown in exemplary embodiment in FIG. 5, a relofted air-filtration web 10 may provide, or be a layer of, an air filter media 1 that is pleated to comprise pleats 401 and pleat tips 402. By "pleated" is meant a substrate (whether monolayer or multilayer) at least portions of which have been folded to form rows of generally parallel, oppositely oriented folds, as will be well understood by ordinary artisans. The pleating of an air-filtration media typically serves to increase the total surface area of the media that is available within a nominal (plane-projected) area; pleating typically does not significantly change inherent properties of the media such as e.g. loft and Percent Penetration of particles.

The pleat height and pleat spacing of the pleated web may be in any suitable range. Pleat height (pleat amplitude) is the distance from upstream tip to downstream tip, along a direction that is orthogonal to the overall major plane of the pleated web. In various embodiments, the pleat height can be at least 4, 6, 8, 10, 12, 14, 16, 18, 20, 30, or 40 mm. In further embodiments, the pleat height may be at most 110, 90, 70, 50, 35, 25 or 14 mm. Pleat spacing is the distance between nearest-neighbor same-side pleat tips, along a direction that is in the major plane of the filter media. In various embodiments the pleat spacing may be at most about 30, 25, 20, 15, 12, 10, 8, 6 or 4 mm. In further embodiments the pleat spacing may be at least about 3, 5, 7, 9 or 11 mm. The pleats may have any desired radius of curvature; for example they may be relatively sinusoidal in appearance or they may be relatively sharp-tipped.

Figure 5:
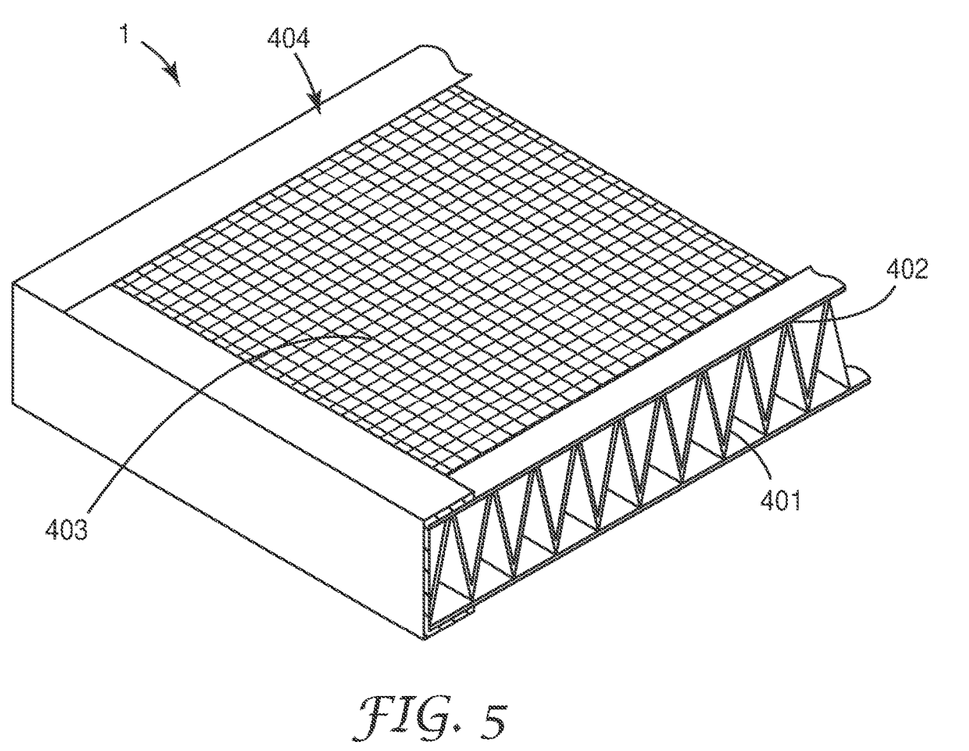
FIG. 5 is a perspective view of a portion of an exemplary air-filter media comprising a relofted, spunbonded nonwoven web as disclosed herein.

If desired, a pleated air filter media 1 (whether in the form of a relofted air-filtration web 10 alone, or in the form of a multilayer structure of which web 10 is a filtration layer), may be stabilized in any suitable manner. This may be particularly useful in the event that, for example, the relofting process appreciably lowers the stiffness of the media. Thus for example, in some embodiments an air filter media may be equipped with any suitable pleat-stabilizing item or items. In general, such items may take the form of members, strips, filaments, a collection of filaments, a perforated cardboard sheet, and so on. Such pleat-stabilizing items may be in contact with (e.g. bonded to) only the tips of the pleats (as with exemplary supporting scrim 403 as shown in FIG. 5); or, they may at least partially follow the pleats of the media and thus may be bonded to pleat walls and/or valleys as well. Pleat-stabilizing items of the former type might include e.g. paperboard strips, polymeric strands, and so on. Pleat-stabilizing items of the latter type might include e.g. wire meshes or chicken-wire type metal grids (e.g. that are applied to the filter media and then pleated along therewith), beads of drizzle glue that are applied to the pleated media, filaments that are extruded onto the surface of the media prior to being pleated, and so on.

In some embodiments, the pleated media may be provided with bridging filaments that are bonded to pleat tips of a major side of the pleated media so as to be in discontinuous contact with the media. In some embodiments, the bridging filaments may be of the general type described in U.S. Provisional Patent Application No. 62/346,179 and in PCT Patent Application Publication WO 2017/213926, both of which are incorporated by reference herein in their entirety for this purpose. In some embodiments, the pleated media may be provided with continuous-contact filaments that are in continuous contact with the pleated media (i.e., that are pleated along with the media). In some embodiments, the continuous-contact filaments may be of the general type described in U.S. Provisional Patent Application No. 62/714,186, entitled PLEATED AIR FILTER WITH REINFORCING FILAMENTS COMPRISING LOCALLY-THINNED BENDING ZONES, which is incorporated by reference herein in its entirety for this purpose.

If desired, a perimeter support frame 404 may be mounted on the major edges of an air filter media 1 (e.g. a pleated air filter media 1) that comprises a relofted air-filtration web 10, e.g. as shown in exemplary manner in FIG. 5. In FIG. 5 a portion of frame 404 has been omitted in order to show pleats 401; also, it is emphasized that FIG. 5 is an exemplary representation and that specific features of media 1 (e.g. the shape of pleat tips 402) may vary from that depicted. In many convenient embodiments an air filter media is rectangular (which terminology encompasses square shapes) with four major edges on which a perimeter support frame is mounted. Such a frame may provide support and rigidification so that the resulting framed air filter can be installed in a suitable location, e.g. in an air-return duct of an HVAC system, in a compartment of a room air purifier, and so on.

Ordinary artisans will appreciate that high-loft spunbond webs (in particular, very high-loft webs with a solidity of e.g. less than 6.0%) may be susceptible to compaction if they are e.g. rolled into a jumbo and held or stored in that condition while awaiting a next processing step. Such compaction may be long-lasting or permanent and may adversely affect the filtration performance. However, it can be cumbersome to operate a meltspinning/bonding process directly inline with pleating and/or framing. Therefore, it may be difficult to produce a high-loft spunbonded web and feed it directly into a pleating and/or framing process so that the loft is retained.

In contrast, operating a relofting process (e.g. a needle-punching operation and/or a hydroentangling operation) inline with a pleating and/or framing process can be relatively straightforward. Thus in some embodiments, the process of relofting an air-filtration web may be performed in-line with a process of pleating the web and/or a process of framing the web. This can advantageously allow a relofted web to be input directly into a process of pleating and/or framing, without the relofted web ever having to be rolled into a jumbo.

A relofted web as disclosed herein is by definition an air-filtration web. By this is meant that the relofted web is purposefully configured to perform particulate filtration of a moving gaseous stream, and is specifically meant that the relofted web exhibits a Quality Factor of at least 0.30. (All references to Quality Factor herein refer to a Quality Factor obtained by testing with dioctyl phthalate (DOP), unless otherwise specified.) Such a relofted web may serve on a stand-alone basis as an air-filtration media; or, the relofted may be used as a filtering layer of a multilayer air-filtration media. A relofted air-filtration web will be distinguished from, for example, nonwoven webs that are configured as absorbent materials for imbibing liquids, e.g. for such applications as hygiene products, diaper components, cleaning wipes, and soon. In particular, a relofted air-filtration web that is charged in order to provide an enhanced ability to capture particles from an airstream will be distinguished from webs that are configured to absorb liquids.

In particular embodiments, a relofted air-filtration web (e.g. a charged web) will be at least essentially free of hydrophilic fibers, powders or the like (e.g. cellulosic pulp fibers as are often included in nonwoven webs to promote water absorption). As would be expected for an air-filtration web, in at least some embodiments a relofted air-filtration web will not comprise any through-holes, through-slits, through-apertures; or, in general, any passage that would allow airborne particles to pass through the web without encountering any fibers.

List of Exemplary Embodiments

Embodiment 1 is an air-filter media comprising a relofted, spunbonded nonwoven web exhibiting a solidity of from less than 8.0%, to at least 3.0%, and exhibiting a Quality Factor of at least 0.30, wherein the relofted, spunbonded nonwoven web is a needle-punched web, a hydroentangled web, or a needle-punched and hydroentangled web.

Embodiment 2 is the air-filter media of embodiment 1 wherein the relofted web comprises a solidity of from less than 7.0% to at least 4.0%.

Embodiment 3 is the air-filter media of any of embodiments 1-2 wherein the relofted web comprises at least some meltspun fibers that are charged.

Embodiment 4 is the air-filter media of any of embodiments 1-3 wherein the relofted web comprises at least some meltspun fibers that are hydrocharged.

Embodiment 5 is the air-filter media of any of embodiments 1-4 wherein the relofted web comprises at least some meltspun, charged fibers that are monocomponent fibers.

Embodiment 6 is the air-filter media of any of embodiments 1-5 wherein the air-filtration web comprises a Quality Factor of at least about 0.70.

Embodiment 7 is the air-filter media of any of embodiments 1-5 wherein the web comprises a Quality Factor of at least about 1.0.

Embodiment 8 is the air-filter media of any of embodiments 1-7 wherein the relofted web comprises fiber-fiber bonds and also comprises broken fiber-fiber bonds.

Embodiment 9 is the air-filter media of any of embodiments 1-8 wherein the relofted web comprises multi-fiber area-bonds that are present at an area ratio of no more than 2.5%.

Embodiment 10 is the air-filter media of any of embodiments 1-9 wherein the relofted web is a pleated relofted web.

Embodiment 11 is the air-filter media of any of embodiments 1-10 further comprising a perimeter support frame mounted on each of four major edges of the air-filter media.

Embodiment 12 is the air-filter media of any of embodiments 1-11 wherein the web is a needle-punched web.

Embodiment 13 is the air-filter media of any of embodiments 1-11 wherein the web is a hydroentangled web.

Embodiment 14 is method of filtering a stream of flowing air, the method comprising passing the stream of flowing air through the air-filter media of any of embodiments 1-13.

Embodiment 15 is a process of relofting a spunbonded precursor web, the process comprising: needle-punching and/or hydroentangling a spunbonded precursor web that comprises a solidity of no more than 10%, to produce a relofted, spunbonded air-filtration web comprising a solidity of from less than 8.0%, to at least 3.0%, and comprising a Quality Factor of at least 0.30.

Embodiment 16 is the process of embodiment 15 wherein the relofting process is a needle-punching process.

Embodiment 17 is the process of embodiment 15 wherein the relofting process is a hydroentangling process.

Embodiment 18 is the process of any of embodiments 15-17 wherein the relofting process is performed in-line with a subsequent process of pleating the relofted, spunbonded air-filtration web.

Embodiment 19 is the process of any of embodiments 15-18 wherein the relofting process is performed in-line with a subsequent process of mounting a perimeter support frame on major edges of the relofted, spunbonded air-filtration web.

Examples

Test Methods
Solidity and Loft

Solidity is determined by dividing the measured bulk density of the nonwoven fibrous web by the density of the materials making up the solid portion of the web. Bulk density of a web can be determined by first measuring the weight (e.g. of a 10-cm-by-10-cm section) of a web. Dividing the measured weight of the web by the web area provides the basis weight of the web, which is reported in $g/m^2$. The thickness of the web can be measured by obtaining (e.g., by die cutting) a 135 mm diameter disk of the web and measuring the web thickness with a 230 g weight of 100 mm diameter centered atop the web. The bulk density of the web is determined by dividing the basis weight of the web by the thickness of the web and is reported as $g/m^3$.

The solidity is then determined by dividing the bulk density of the nonwoven fibrous web by the density of the material (e.g. polymer) comprising the solid filaments of the web. The density of a bulk polymer can be measured by standard means if the supplier does not specify the material density. Solidity is a dimensionless fraction which is usually reported in percentage.

Loft is usually reported as 100% minus the solidity (e.g., a solidity of 7% equates to a loft of 93%).

Percent (%) Penetration, Pressure Drop, and Quality Factor

Percent (Particle) Penetration, Pressure Drop and the filtration Quality Factor (QF) of the nonwoven fibrous webs are determined using a challenge aerosol containing DOP (dioctyl phthalate) liquid droplets, delivered (unless otherwise indicated) at a flow rate of 85 liters/min to provide a face velocity of 14 cm/s, and evaluated using a TSI (Registered Trademark) Model 8130 high-speed automated filter tester (commercially available from TSI Inc., Shoreview, MN). For DOP testing, the aerosol may contain particles with a diameter of about 0.185 μm, and the Automated Filter Tester may be operated with the heater off and the particle neutralizer on. Calibrated photometers may be employed at the filter inlet and outlet to measure the particle concentration and the % particle penetration through the filter. An MKS pressure transducer (commercially available from MKS Instruments, Wilmington, MA) may be employed to measure the Pressure Drop (ΔP, mm H2O) through the filter. The equation:

$$QF = \frac{-\ln\left(\frac{\%\ \text{Particle Penetration}}{100}\right)}{\Delta P}$$

may be used to calculate QF from the Pressure Drop and Percent (Particle) Penetration.

Dust Holding Capacity (DHC)

The Dust Holding Capacity (and other filtration properties such as e.g. Capture Efficiency, Arrestance, and Minimum Efficiency Reporting Value (MERV)) of filters are measured in accordance with the general methods in ASHRAE Standard 52.2 ("Method of Testing General Ventilation Air-Cleaning Devices for Removal Efficiency by Particle Size"). The Dust Holding Capacity test involves configuring the web as a filter (e.g., a pleated and/or framed filter), installing the filter into a test duct and subjecting the filter to incremental dust loading steps, using a synthetic dust as specified in the ASHRAE 52.2 standard. The Dust Holding Capacity is the total weight of the synthetic dust captured by the air-filter sample over all of the incremental dust loading steps. In the present case, the samples that were tested for Dust Holding Capacity were pleated as described below. The Dust Holding Capacity for all samples is thus normalized to the surface area of the air-filter sample and is reported in grams of dust per square meter.

Working Examples

High-loft spunbonded webs were obtained. The meltspun fibers had been made and collected in general accordance with the procedures described in the Examples of U.S. Pat. No. 8,240,484. The collected fibers had been autogenously bonded to form self-supporting, spunbonded webs in general accordance with the procedures described in U.S. Pat. No. 9,976,771, and had also been area-bonding using calendering methods of the general manner described in the '484 patent. The area-bonds were estimated to be present at an area percentage of the web of approximately 1.5-1.6%. The webs had been hydrocharged in general accordance with the procedures disclosed in U.S. Patent Application Publication No. 2012/0017910. The webs were obtained in two grades, Grade 55 which exhibited a basis weight of approximately 55 grams per square meter and a solidity of approximately 7.5; and, Grade 75, which exhibited a basis weight of approximately 75 grams per square meter and a solidity of approximately 7.9. Both grades of material were obtained as flat-web samples.

The flat-web samples were relofted by needle-punching. The needles were provided (in a topside-punching arrangement including a top hole-board and a bottom hole-board with approximately 50 mm vertical spacing therebetween) in 32 rows, each row extending across an 85 cm lateral (crossweb) width with the rows being spaced along a 28.5 cm downweb extent. Each row had 104 needles (the within-row needle spacing was thus approximately 8 mm). The needles were of the general type available under the trade designation F20-9-28-7-B, Needle #5230160, 15×18×30× 3.5 RB by Foster Needle Co.; Manitowoc, WI. The web was passed through the needle-puncher in a continuous manner at a speed of around 1.5 meters per minute. As the web passed through the needle-punching unit it was needle-punched at a rate of approximately 150 strokes per minute with a stroke depth of 60 mm. From these parameters it was estimated that the web was punched at a density of approximately 40 punches per square centimeter of web material. The punching was performed from one side (the top side) only.

The increase in loft of the web was notably evident even upon casual visual inspection. That is, the relofted web was noticeably thicker and "fuzzier" than the as-received web, and very few of the area-bonded areas were still visible; rather, they seemed to be obscured by fibers that were overlying them. The relofted web exhibited a very uniform appearance.

Solidity and Quality Factors for these relofted samples, along with the as-received webs, are presented in Table 1. These were run on flat-web samples. Each data point is an averaged value for multiple measurements. As noted herein, all such measurements were obtained over macroscopic areas of the relofted web; the results are thus overall values.

The Dust Holding Capacity (DHC) for a relofted Grade 55 sample is also included. For the DHC test, the sample was pleated to form a pleated filter with an overall (nominal) size of 16 inches×20 inches, with a pleat height of 0.75 inches and a pleat density of approximately 1.1 pleats per inch. The "as-is" (non-relofted) Grade 55 control sample was similarly pleated.

TABLE 1

| Property | Sample | | | |
|---|---|---|---|---|
| | 55 | 55-Relofted | 75 | 75-Relofted |
| Solidity (%) | 7.5 | 3.9 | 7.9 | 4.6 |
| Quality factor 1/(mm H$_2$O) | 1.1 | 2.0 | 1.0 | 1.7 |
| Dust Holding Capacity (g/m$^2$) | 16 | 59 | — | — |

As is evident from Table 1, these relofted samples exhibited an enhancement (% increase, relative to the as-received samples) in Quality Factor of from approximately 70% to approximately 80%. The relofted sample (Grade 55) that was tested for Dust Holding Capacity exhibited a very large enhancement in Dust Holding Capacity relative to the "as-is" web.

Variations

Other Needle-Punching Conditions

Samples were needle-punched at various punching densities that were estimated to be in a range of from approximately 30 punches per square cm to 280 punches per square cm. Not all of these samples were characterized for Quality Factor or Dust Holding Capacity; however, they appeared physically similar to the above-described samples and it was believed that they would have performed at least generally similarly to (or better than) the above-described examples.

Corona Charging

Samples were obtained that were generally similar to Grade 55 but that exhibited a basis weight of approximately 50, and had been corona charged using methods conventional in the art rather than being hydrocharged. The samples were relofted by needle-punching in similar manner as described above. The relofted samples exhibited a Quality Factor of approximately 1.0, in comparison to the as-received samples which exhibited a Quality Factor of approximately 0.55.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used. It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). Although various theories and possible mechanisms may have been discussed herein, in no event should such discussions serve to limit the claimable subject matter. To the extent that there is any conflict or discrepancy between this specification as written and the disclosure in any document that is incorporated by reference herein but to which no priority is claimed, this specification as written will control.

What is claimed is:

1. An air-filter media consisting essentially of a single-layer, relofted, spunbonded nonwoven web exhibiting a solidity of from less than 8.0%, to at least 3.0%, and exhibiting a Quality Factor of at least 0.30, wherein the relofted, spunbonded nonwoven web is a needle-punched web, and wherein the relofted web comprises fiber-fiber melt-bonds and also comprises broken fiber-fiber melt-bonds.

2. The air-filter media of claim 1 wherein the relofted web comprises a solidity of from less than 7.0% to at least 4.0%.

3. The air-filter media of claim 1 wherein the relofted web comprises at least some meltspun fibers that are charged.

4. The air-filter media of claim 1 wherein the relofted web comprises at least some meltspun fibers that are hydrocharged.

5. The air-filter media of claim 1 wherein the relofted web comprises at least some meltspun, charged fibers that are monocomponent fibers.

6. The air-filter media of claim 1 wherein the relofted web comprises a Quality Factor of at least about 0.70.

7. The air-filter media of claim 1 wherein the relofted web comprises a Quality Factor of at least about 1.0.

8. The air-filter media of claim 1 wherein the relofted web comprises multi-fiber area-bonds that are present at an area ratio of no more than 2.5%.

9. The air-filter media of claim 1 wherein the relofted web is a pleated relofted web.

10. A framed air filter comprising the air-filter media of claim 1 and a perimeter support frame mounted on each of four major edges of the air-filter media.

11. A method of filtering a stream of flowing air, the method comprising passing the stream of flowing air through the air-filter media of claim 1.

12. A process of relofting a spunbonded precursor web to form the air-filter media of claim 1, the process comprising:
needle-punching a spunbonded precursor web that comprises fiber-fiber melt-bonds and that comprises a solidity of no more than 10%, to produce a relofted, spunbonded air-filtration web comprising a solidity of from less than 8.0%, to at least 3.0%, comprising a Quality Factor of at least 0.30, and that comprises fiber-fiber melt-bonds and broken fiber-fiber melt-bonds.

13. The process of claim 12 wherein the relofting process is performed in-line with a subsequent process of pleating the relofted, spunbonded air-filtration web.

14. The process of claim 12 wherein the relofting process is performed in-line with a subsequent process of mounting a perimeter support frame on major edges of the relofted, spunbonded air-filtration web.

15. The process of claim 12 wherein in the relofted, spunbonded air-filtration web, greater than 5% of the fiber-fiber melt-bonds are broken fiber-fiber melt-bonds.

16. The air-filter media of claim 1 wherein greater than 5% of the fiber-fiber melt-bonds are broken fiber-fiber melt-bonds.

* * * * *